United States Patent
Lesieur et al.

(10) Patent No.: US 6,284,206 B1
(45) Date of Patent: Sep. 4, 2001

(54) COMPACT SELECTIVE OXIDIZER ASSEMBLAGE FOR A FUEL CELL POWER PLANT

(75) Inventors: Roger R. Lesieur, Enfield; Thomas J. Corrigan, Vernon; Derek W. Hildreth, Enfield, all of CT (US)

(73) Assignee: International Fuel Cells, LLC, So. Windsor, CT (US)

( * ) Notice: Subject to any disclaimer, the term of this patent is extended or adjusted under 35 U.S.C. 154(b) by 0 days.

(21) Appl. No.: 09/273,735

(22) Filed: Mar. 22, 1999

(51) Int. Cl.$^7$ .................................. F01N 3/00; F28D 1/04

(52) U.S. Cl. ..................... 422/198; 422/173; 422/177; 422/211; 165/58; 165/138

(58) Field of Search ................................ 422/173, 177, 422/180, 198, 211; 165/41, 51, 58, 138, 148, 117, 186

(56) References Cited

U.S. PATENT DOCUMENTS

| | | | |
|---|---|---|---|
| 3,563,212 | * 2/1971 | Hoagland | 122/250 R |
| 4,027,476 | * 6/1977 | Schmidt | 60/218 |
| 4,303,125 | * 12/1981 | Vahlbrauk | 165/168 |
| 4,308,233 | 12/1981 | Narumiya et al. | 422/169 |
| 4,695,301 | * 9/1987 | Okajima et al. | 55/523 |
| 4,902,664 | * 2/1990 | Wan | 502/300 |
| 5,330,727 | * 7/1994 | Trocciola et al. | 422/177 |
| 5,465,783 | 11/1995 | O'Conner | 165/134.1 |
| 5,823,770 | * 10/1998 | Matros et al. | 432/181 |
| 5,853,674 | 12/1998 | Lesieur | 422/173 |
| 5,874,051 | 2/1999 | Hell et al. | 422/171 |
| 5,881,775 | * 3/1999 | Owen et al. | 138/149 |
| 6,132,689 | 10/2000 | Skala et al. | 422/193 |

FOREIGN PATENT DOCUMENTS 0 913 357 A1  5/1999  (EP) .............................. C01B/3/38

* cited by examiner

*Primary Examiner*—Marian C. Knode
*Assistant Examiner*—Alexa A. Doroshenk
(74) *Attorney, Agent, or Firm*—William W. Jones

(57) ABSTRACT

A process gas selective oxidizer assemblage for use in a fuel cell power plant includes one or more catalyzed selective oxidizer process gas flow fields and one or more adjacent non-catalyzed heat exchanger process gas flow fields. The catalyzed selective oxidizer process gas flow fields may be formed with catalyzed pellets or with a monolithic catalyzed open cell foam component. The heat exchanger process gas flow fields are formed by non-catalyzed monolithic open cell foam components which have coolant fluid passages disposed therein. Planar metal sheets form a common wall between the selective oxidizer process gas flow fields and the heat exchanger process gas flow fields. The use of the open cell foam to form the heat exchanger process gas flow fields provides enhanced heat transfer between the reformate gas and the coolant fluid. The use of the foam components in both the heat exchange process gas flow fields and the selective oxidizer process gas flow fields enables the construction of a more compact and lighter weight selective oxidizer assemblage. The repeating components are placed side-by-side in the assemblage, so that one of the catalyzed process gas flow fields operates at a higher temperature than subsequent catalyzed process gas flow fields. The process gas enters the higher temperature catalyzed flow field after it is admixed with air that is injected into the system just prior to the higher temperature flow field. The process gas-air mixture flows through the first higher temperature catalyzed process gas flow field; thence through a non-catalyzed heat exchanger process gas flow field; thence through a lower temperature catalyzed process gas flow field; thence through another heat exchanger process gas flow field; and so on, until the selectively oxidized process gas exits the assemblage.

27 Claims, 3 Drawing Sheets

COMPACT SELECTIVE OXIDIZER ASSEMBLAGE FOR A FUEL CELL POWER PLANT

TECHNICAL FIELD

This invention relates to a selective oxidizer assemblage which is formed from a plurality of repeating subassemblies. More particularly, this invention relates to a fuel gas selective oxidizer assemblage which is more compact and lighter in weight than conventional selective oxidizer assemblages which are used in fuel cell power plants.

BACKGROUND ART

Some fuel cell power plants include fuel gas selective oxidizers which are operable to reduce carbon monoxide to low levels in a reformed fuel gas, such as natural gas, before the gas is used as a fuel for fuel cell power plants. The procedure involves passing a mixture of the reformed fuel gas and gaseous oxygen through a catalytic bed which is capable of oxidizing carbon monoxide in an exothermic reaction. The reaction proceeds at controlled temperatures which are within a given range of about 360° F. to about 170° F. The temperature of the catalyst bed must be maintained above a particular threshold temperature which is between about 220° F. to about 360° F. at the entry stage of the catalyst bed, where the gases being treated are relatively rich in carbon monoxide, and will be reduced to lower temperatures of about 170° F. to about 220° F. at latter stages of the catalyst bed where the carbon monoxide content of the gas is lower. However, with good temperature control and heat transfer, the temperature can be as high as 240° F. in the low temperature bed.

The catalysts typically used are platinum catalysts which are deposited on alumina granules. U.S. Pat. No. 5,330,727, granted Jul. 19, 1994 to J. C. Trocciola et al discloses a selective oxidizer assemblage which is proposed for use in a fuel cell power plant and describes the temperature regimes required to properly oxidize the carbon monoxide. The type of oxidizer shown in the aforesaid patent is conventionally referred to as a "shell and tube" heat exchanger.

The shell and tube fuel cell power plant selective oxidizers require a large amount of heat transfer surface area between the catalyst bed and the coolant in order to maintain the controlled temperatures needed to produce the degree of carbon monoxide oxidization required to operate the fuel cells properly. This need for large heat transfer surface area, when met by using catalyst-coated granules requires that the catalyst coated granules be diluted, which results in undesirably large and heavy oxidizer assemblies. For example, a 20 KW acid fuel cell power plant that includes a shell and tube oxidizer component requires a volume of about 4 cubic feet for the oxidizer. Higher power fuel cell power plants, such as 200 KW plants or larger, will require proportionately larger fuel gas oxidizers.

U.S. Pat. No. 5,853,674, granted Dec. 29, 1998 discloses a selective oxidizer assemblage which does not utilize catalyzed pellets, but rather uses a corrugated catalyst bed core which has catalyzed walls. The corrugated catalyst bed core forms parallel passages for the fuel being selectively oxidized, and also forms adjacent parallel coolant passages which are disposed in direct heat exchange relationship with the catalyst bed gas passages. This assemblage is lighter in weight and more compact than a selective oxidizer which uses catalyzed pellets and, because of the very high surface area of the corrugated core, provides very efficient heat transfer between the catalyzed bed passages and the coolant passages. The assemblage is formed from a sequence of essentially flat plates which are sandwiched around the corrugated passages, and the assemblage has a repeating pattern of catalyzed bed passages and non-catalyzed coolant passages. Gas flow reversal manifolds connect the catalyzed bed passages with the coolant passages. While the aforesaid flat plate assemblage makes a significant improvement in the reduction of weight and size, it does not fully meet the requirements and it does not sufficiently mix the flow pattern of the gases passing through it because of the inclusion of the corrugated gas flow passages. Thus the corrugated design provides a more desirable size and weight selective oxidizer assemblage, but the catalyzed pellet design provides a more extensive gas mixing flow pattern.

It would be desirable to provide a selective oxidizer which provides greater heat exchange capabilities in a smaller package. It would be highly desirable to provide a selective oxidizer assemblage for a process gas which is suitable for use in a fuel cell power plant, which selective oxidizer assemblage provides a gas mixing flow pattern of the catalyzed pellets and is compact and light in weight like the catalyzed wall selective oxidizer described above. It would be highly desirable to provide a process fuel gas selective oxidizer which is suitable for use in a fuel cell power plant, which selective oxidizer provides the necessary catalyzed and non-catalyzed coolant surface areas, but is compact, strong, and light in weight.

DISCLOSURE OF THE INVENTION

This invention relates to a selective oxidizer assemblage which provides the necessary catalyzed and heat transfer surface area, is compact and light weight, and provides an internal extensive gas mixing flow pattern. The selective oxidizer assemblage of this invention is similar to the above-referenced corrugated passage selective oxidizer assemblage, in that it includes a series of essentially flat plate assemblage components. Each of the selective oxidizer components includes a catalyzed oxidizer component which is positioned adjacent to a heat exchanger component. At an entry end of the assemblage, a high temperature selective oxidizer component is connected to a fuel manifold. In this case, not shown is an initial $O_2$ or air injection tube which results in a fuel-oxygen mixture being fed into the high temperature oxidizer component. The opposite end of each component is provided with a flow reversal manifold that directs the fuel gas-steam mixture emanating from the catalyzed flow passage component back into an adjacent non-catalyzed heat exchanger flow passage component A selective oxidizer exit manifold is also disposed at the first end of each component to direct the emerging gas stream to the next station in the power plant. Adjacent selective oxidizer components are separated from each other by heat exchanger gas passage components through which the process gas flows. Thus, each of the catalyzed flow units is disposed directly adjacent to a heat exchanger unit, and the adjacent catalyzed flow passage units and heat exchanger units share a common wall.

As with the above-referenced selective oxidizer assemblage, the flat plate components of the selective oxidizer assemblage may be formed from planar metal sheets which are separated from each other by monolithic open cell foam gas flow passage components. However, in this configuration the flat plates are replaced with heat exchanger elements. This addition means improved temperature control in each of the sections of the selective oxidizer which results in a further reduction in size and weight. The monolithic selective oxidizing gas flow components are provided with a network of interconnected open cells, the surfaces of which are wash coated with a high surface area catalyst support, such as alumina or silica-alumina and catalyzed with noble metal catalysts such as platinum, palladium, rhodium, or the like, or with a noble metal catalyst which is promoted with metal oxides, such as iron oxide, cerium oxide, manganese dioxide, or the like. The open cell foam network provides the high surface area support needed to provide sufficient catalyst surface area to properly reduce the CO content of the fuel gas. In fact, the catalyzed surface area of the open cell foam is up to twice that of the catalyzed surface area of the corrugated panels described in the above-mentioned patent. The open cell foam network also provides an effective gas mixing flow pattern for gases passing through the monolith, since the gases will flow both laterally and longitudinally through the monolith. The metal heat exchanger elements which make up the flat plate catalyzed components may have their surfaces covered with a catalyzed alumina coating. The flat plate walls and the monolith foam components in the heat exchange sections of the assemblage are not catalyzed and are not likely to be wash coated.

The surfaces that are catalyzed are primed with a conventional wash coat, such as that provided by W. R. Grace and Co., or Englehard Corp. The wash coat produces a porous alumina or silica-alumina layer which forms the support layer for the catalyst coating. The heat exchanger elements forming the flat plate components are aluminum, stainless steel, or steel alloy plates preferably containing aluminum, and can be brazed or otherwise bonded to the foam so that good heat transfer is maintained; surface treated; wash coated; and then selectively coated with the catalyst. The use of the heat exchanger elements (flat plates, flattened or round tubes, etc.) and open cell monolith construction, with its maximized gas flow surface area and excellent heat transfer characteristics, allows minimization of the selective oxidizer assemblage's size and weight. The core of the open cell monolith component may be formed from aluminum, nickel, stainless steel, an aluminum-stainless steel alloy, or from a ceramic material. It will be understood that the interstices, as well as the outside surfaces of the open cell monolith in the selective oxidation section are wash coated and, where desirable, are also catalyzed.

It is therefore an object of this invention to provide an improved selective oxidizer assemblage which selective oxidizer assemblage is compact and light weight.

It is a further object of this invention to provide a selective oxidizer assemblage of the character described which provides enhanced heat transfer properties in heat exchange sections thereof.

It is yet a further object of this invention to provide a selective oxidizer assemblage of the character described which provides enhanced heat transfer properties in the catalyzed sections thereof.

It is another object of this invention to provide a selective oxidizer assemblage of the character described which provides effective gas flow mixing paths for fuel gases flowing through the assemblage.

It is yet another object of this invention to provide a selective oxidizer assemblage of the character described which has high surface area catalyzed surfaces that are contacted by the process fuel gases flowing through the assemblage.

It is yet another object of this invention to provide a selective oxidizer assemblage of the character described having catalyst beds which provide a lower pressure drop than pelletized selective oxidizer catalyst beds while maintaining the good gas mixing characteristics of pelletized beds.

These and other objects and advantages of this invention will become readily apparent to one skilled in the art from the following detailed description of a preferred embodiment of the invention when taken in conjunction with the accompanying drawings in which:

SPECIFIC MODE FOR CARRYING OUT THIS INVENTION

Figure 1:
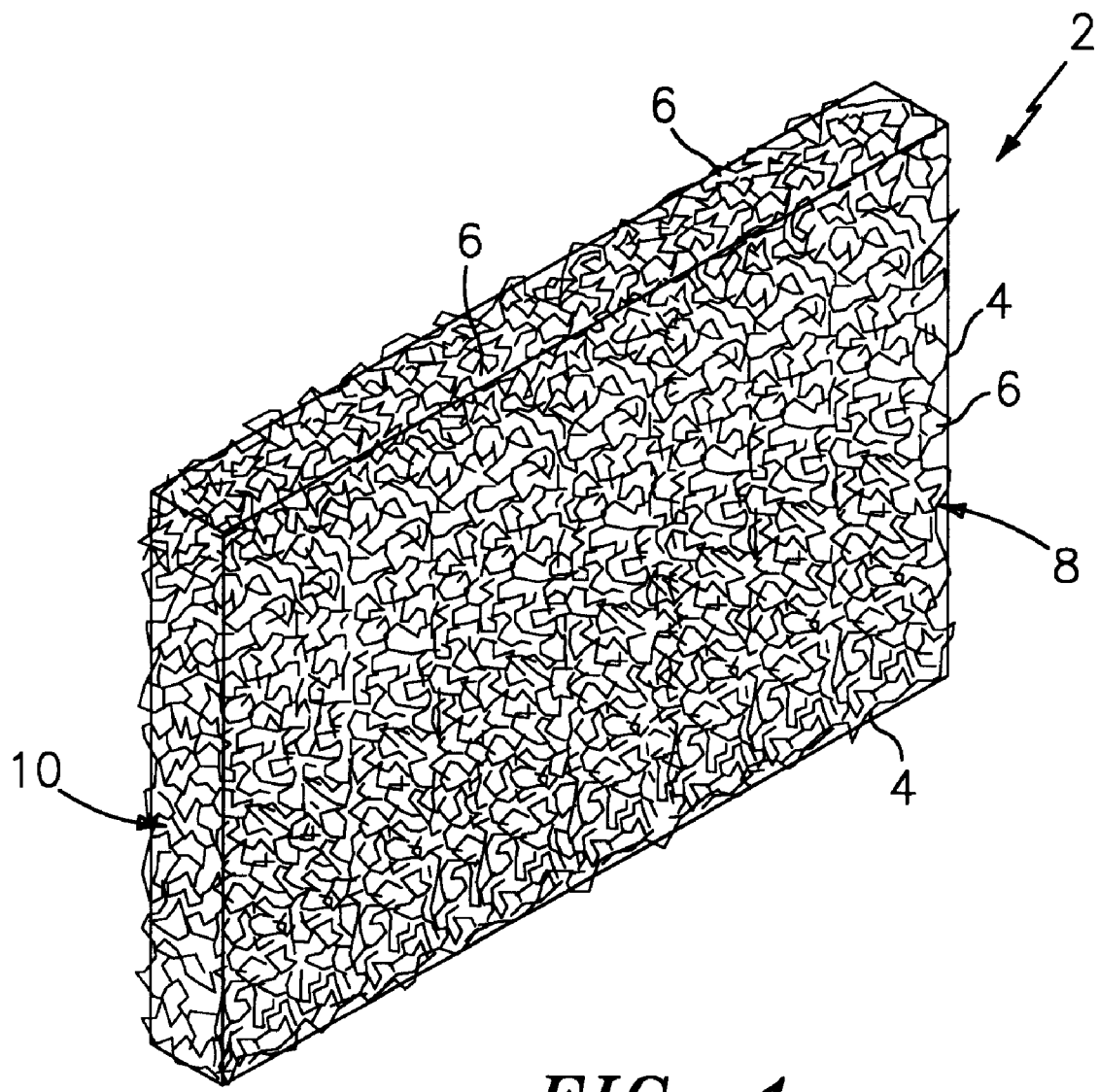
FIG. 1 is a perspective view of a monolithic open cell foam component which forms a portion of the selective oxidizer assemblage of this invention.

Referring now to the drawings, FIG. 1 is a perspective view of a monolithic open cell foam component 2 which is used in constructing a selective oxidizer assemblage formed in accordance with this invention. The component 2 includes a lattice 4 which has open cell interstices 6 that form a diffuse gas flow path for a gas stream flowing through the component 2 from one end 8 to an opposite end 10 thereof. It will be appreciated that the lattice 4 and the open cell interstices 6 provide a monolith with a very high gas-contacting surface area which can be varied to control the performance or reaction rates as the gas passes through a catalyst bed formed from the component 2. Additionally, the ratio of lattice volume to open cell volume can be varied to provide a gas flow path with an optimum pressure drop from end 8 to end 10 of the component 2.

Figure 2:
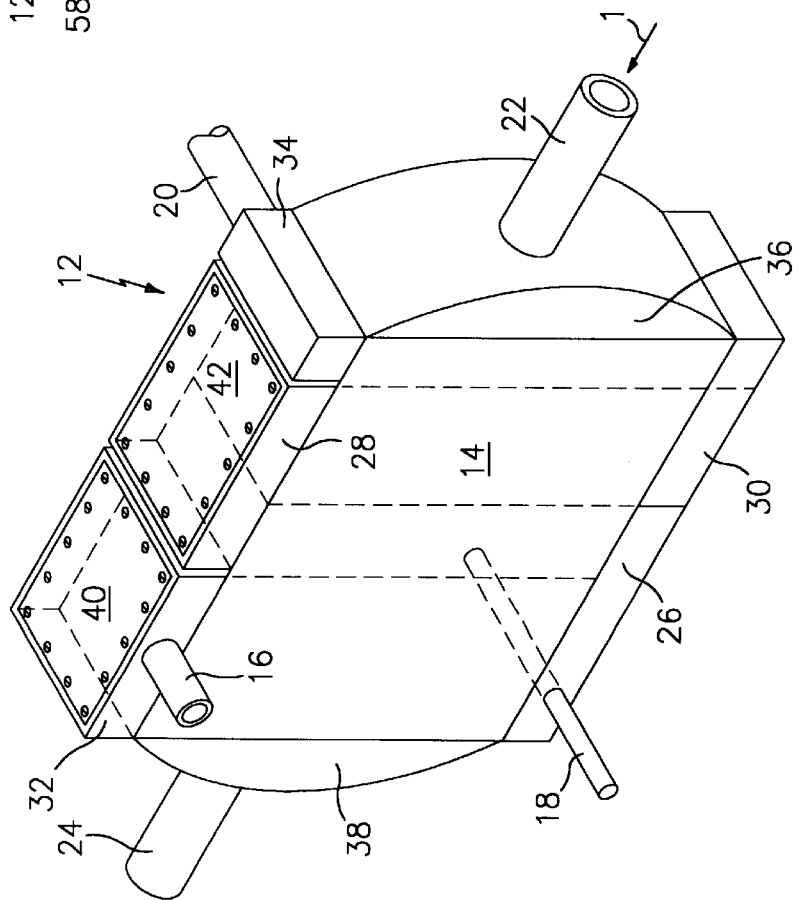
FIG. 2 is a schematic, fragmented perspective view of one embodiment of a selective oxidizer assemblage which is formed in accordance with this invention.

FIG. 2 is a schematic view of a fuel cell selective oxidizer assemblage 12 which forms a portion of a typical fuel cell power plant. The selective oxidizer assemblage 12 includes a component housing 14; a process fuel inlet 16; an air inlet 18; a process fuel outlet 20; a coolant fluid inlet 22; and a coolant fluid outlet 24. The assemblage 12 includes process gas flow reversal manifolds 26, 28 and 30, as well as a process gas entry manifold 32, and a process gas exit manifold 34. The coolant fluid inlet 22 connects with a coolant inlet distribution manifold 36, and the coolant fluid outlet 24 connects with a coolant fluid collection manifold 38. The process gas fuel inlet manifold 32 and the process gas fuel flow reversal manifold 28 may be provided with removable cover plates 40 and 42 respectively which allow access to the catalyst bed chambers in the housing 14 for loading of catalyzed pellets therein when catalyst pellets are used in the catalyst beds.

Figure 3:
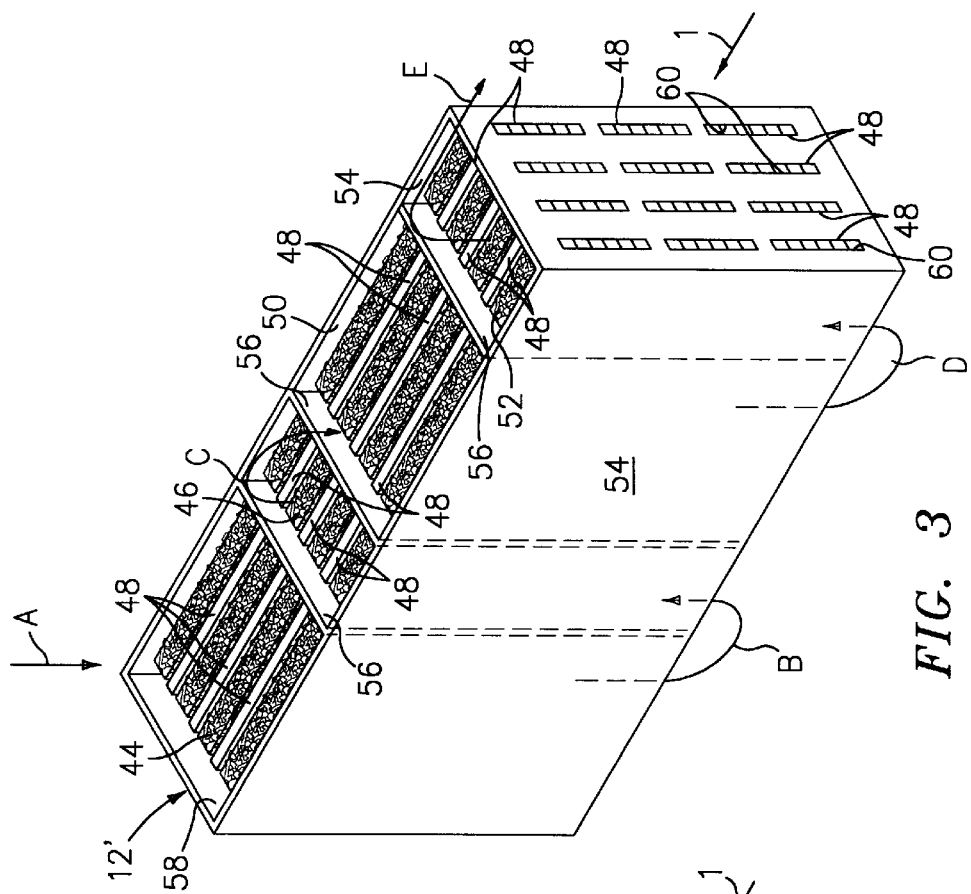
FIG. 3 is a schematic perspective view of the selective oxidizer assemblage of FIG. 2 with the outer walls thereof removed so as to show the gas flow path and the internal structure of the assemblage.

FIG. 3 is a schematic representation of the internal construction 12' of the selective oxidizer assemblage 12 of FIG. 2. The assemblage 12' includes a first or inlet catalyzed selective oxidizer bed 44 through which the process gas and a metered amount of injected air (source not shown) is to be treated by flowing, per arrow A. The bed 44 may be formed from catalyzed alumina pellets, or from a wash coated catalyzed monolith foam of the type shown in FIG. 1. Arrow B indicates the reversal of the gas stream after exiting the first catalyzed bed 44. After exiting the bed 44, a second metered amount of air is injected into the gas stream via line 18, then the partially oxidized gas stream enters a first heat exchanger section 46 of the assemblage 12'. The heat exchanger section 46 is formed by the monolithic foam of FIG. 1 which is bonded to a plurality of coolant fluid passage units 48 which also pass through the catalyst bed section. The partially oxidized process gas stream flows through the foam monolith until it exits the first heat exchanger section 46 whereupon it reverses its direction of flow, as indicated by arrow C, and enters a second catalyzed bed 50 wherein the gas stream is further oxidized. After passing through the second oxidizer bed 50, the fully oxidized gas stream exits the assemblage 12' through a second heat exchanger section 52, as indicated by arrow E.

The portion 12' of the assemblage 12 shown in FIG. 3 includes outer side plates 54 which form opposed walls of the catalyzed beds 44 and 50, and which also form opposed walls of the heat exchanger sections 46 and 52. Transverse plates 56 separate the catalyst beds 44 and 50 from adjacent heat exchanger sections 46 and 52. End plates 58 are provided with openings 60 through which the coolant fluid units 48 project. The coolant fluid units 48 preferably take the form of extruded aluminum bodies with parallel through passages through which the coolant fluid flows. It will be appreciated that the plates 54, 56 and 58 are preferably brazed to the monolith foam components, whereby the foam components, as well as providing process gas flow passages, also provide an internal skeleton for the internal assemblage 12' of the selective oxidizer 12. It will be noted that in the embodiment of the selective oxidizer shown in FIGS. 2 and 3, the process gas flows into one side at one end of the assemblage 12 and exits the assemblage 12 on the opposite side and opposite end thereof.

Figure 5:
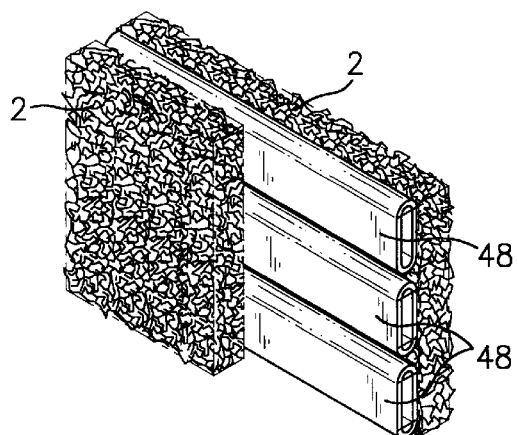
FIG. 5 is a fragmented perspective view of a sub-component of the selective oxidizer assemblage of FIG. 4.
Figure 4:
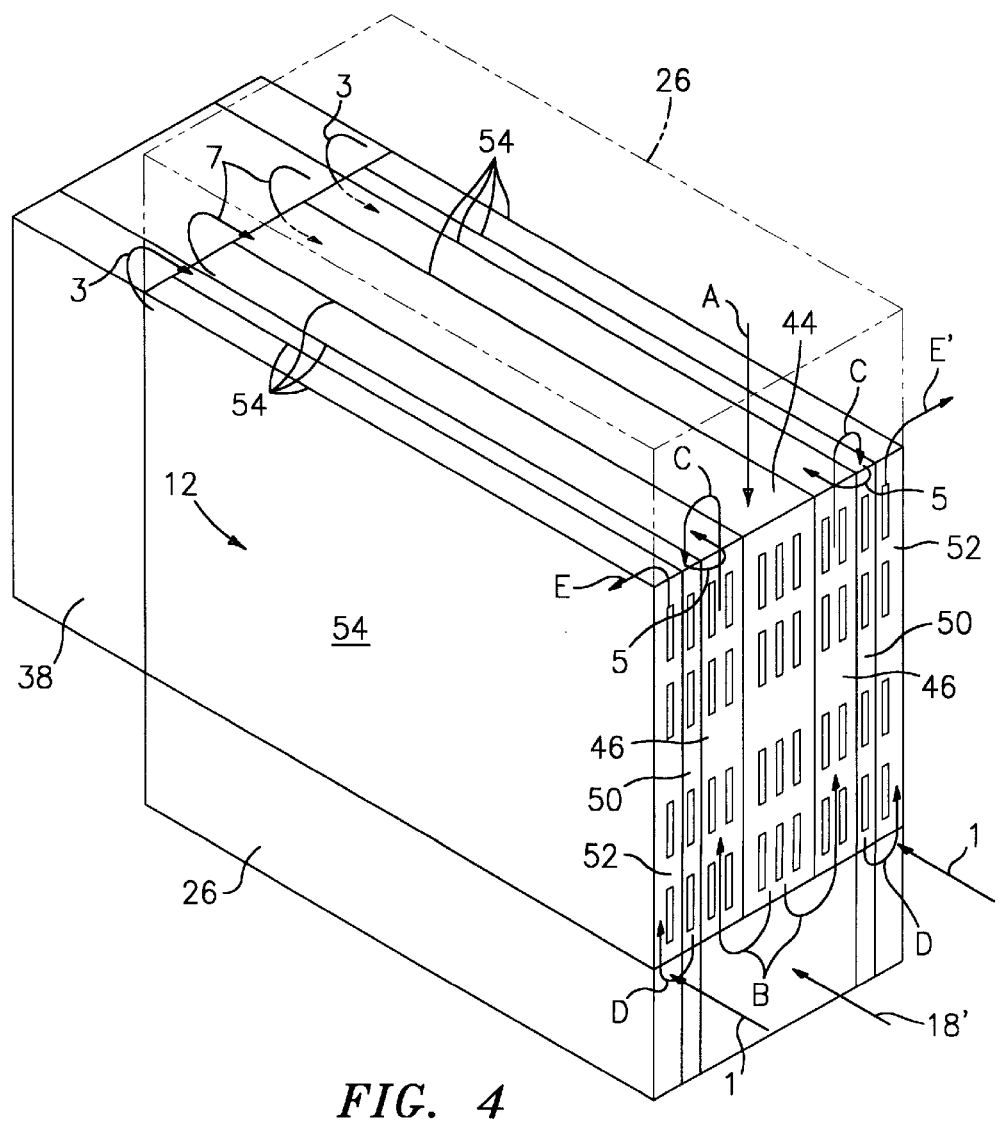
FIG. 4 is a schematic perspective view of a second embodiment of a selective oxidizer assemblage formed in accordance with this invention.

FIG. 4 shows an alternate embodiment of the selective oxidizer which is formed from sub-assembly "building blocks" of the type shown in FIG. 5. In the embodiment shown in FIG. 4, both the catalyzed bed components and the heat exchanger components are formed from the foam monolith material, and the process gas enters the assemblage 12 via a central catalyst bed 44, as indicated by arrow A. The process gas with a metered amount of injected air flows through the initial catalyst bed 44 after which it again receives a metered amount of air, as indicated by arrow 18'. After exiting the initial catalyst bed 44, partially oxygenated process gas stream reverses its direction of flow, as indicated by arrows B, and the process gas stream enters a pair of initial heat exchanger sections 46 through manifold 26. After exiting the heat exchanger sections 46, the cooled partially oxidized fuel gas stream enters another flow reversal manifold 26 (shown in phantom) wherein the gas stream reverses its direction of flow, as noted by arrows C, and enters secondary catalyst beds 50 wherein the process gas is further oxidized. After exiting the secondary catalyst beds 50, the process gas stream once again enters the manifold 26 and reverses its direction of flow, as indicated by arrows D, and enters second heat exchanger sections 52 as indicated by arrows E and E. After exiting the second heat exchanger sections 52, the fully oxidized process gas stream can be used to feed a single, or separate fuel cell stack assemblies (not shown).

The coolant fluid enters the assemblage 12 through heat exchanger sections 52, as indicated by arrows 1. After exiting the heat exchanger sections 52, the coolant fluid reverses its direction of flow as indicated by arrows 3, and flows through the catalyst beds 50, after which the coolant fluid once again reverses its direction of flow as indicated by arrows 5, whereupon the coolant fluid flows through the heat exchangers 46. After exiting the heat exchangers 46, the coolant fluid again reverses its direction of flow, as indicated by arrows 7, and passes through the catalyst bed 44. After exiting the catalyst bed 44, the coolant fluid leaves the assemblage 12.

FIG. 5 illustrates the manner in which the process gas flow field-coolant flow conduit building blocks of the assembly shown in FIG. 4 can be fabricated. The coolant flow conduit is preferably a flat tube heat exchanger element with internal coolant passages. The open cell monolith foam components 2 are sandwiched about and brazed to coolant passage units 48, as shown in FIG. 5. The finished sub-assemblies are then laid up with the separator plates, and brazed together so as to form the coherent core assemblage 12' shown in FIG. 4. The brazed sub-assemblies which are used to form the heat exchanger sections are not wash coated or catalyzed. Each of the brazed sub-assemblies which are used to form the catalyst beds are then wash coated with a high surface area support, such as alumina or silica-alumina, and the resultant porous wash coated surfaces are catalyzed. The brazing steps may all be performed at the same time.

As previously noted, the metal components of the selective oxidizer assemblage are preferably formed from aluminum, stainless steel, or a steel based alloy containing aluminum. The planar walls and the gas flow monoliths are assembled by welding or brazing the assemblage. The assemblage is treated to allow the wash coat to adhere during thermal cycles, for example, by heat treating to generate a surface coating of aluminum oxide on all of the exposed surfaces in the catalyst beds. A wash coating primer is applied to the surfaces to be catalyzed. The catalyst coating is then applied to the wash coated surfaces of the catalyst bed passages.

The assemblage 12' is capable of selectively oxidizing carbon monoxide (CO) in the reformer fuel gas, and operates as follows. Referring to FIGS. 2 and 3, the fuel gas\oxygen mixture, which may contain as much as 20,000 ppm CO and also contains a metered amount of injected oxygen or air before it enters the assemblage inlet 16 at temperatures which are typically in the range of about 220° F. to about 360° F. The coolant stream enters the coolant inlet 22 at temperatures in the range of about 140° F. to about 200° F. It is important to maintain the fuel gas mixture at a temperature of not less than about 220° F at the inlet end 16 of the first selective oxidizer bed 44 so as to ensure that the catalyst in the fuel gas mixture flow passages of bed 44 is not rendered ineffective by the relatively large percentage of CO in the gas mixture. The threshold temperature for catalyst degradation is about 220° F., however, if the catalyst bed temperature increases to greater than about 360° F. to about 380° F., the catalyst loses its selectivity, and the hydrogen in the reformed gas stream will be burned in lieu of the CO in the gas stream. The high heat transfer provided by this assemblage with the increased catalyzed surfaces in the catalyst beds, and the heat transfer fluid maintains the gas stream at an optimum temperature, even when there is a large quantity of heat generated from oxidation of CO in the gas stream. The gas stream will exit from the first selective oxidizer bed 44 at a temperature which is in the range of about 220° F. to about 380° F. The coolant stream exits the first selective oxidizer bed 44 at a temperature which is in the range of about 140° F. to about 200° F.

At the gas stream reversal point B, the CO content of the gas stream is typically in the range of about 300 to about 500 ppm. The fuel gas stream then passes through the first heat exchange unit 46 wherein the fuel gas stream is cooled to a temperature in the range of about 170° F. to about 240° F. Additional oxygen, injected upstream of the system shown in the drawings, and not shown in the drawings, may be added to the gas stream by means of line 18. The reoxygenated fuel gas leaves the heat exchange bed 46 and then enters the second catalyzed selective oxidizer bed 50 as indicated by arrow C. The temperature of the fuel gas stream will be maintained in the range of about 170° F. to about 240° F. while in the bed 50, and the CO content of the fuel gas stream will be lowered to less than about 10 ppm in the bed 50. The fuel gas stream then flows into the heat exchanger 52 wherein the temperature of the fuel gas stream will be lowered to about 170° F. to about 180° F. The fuel gas stream which exits the assemblage 12 through line 20 will have a temperature of about 180° F., and a CO content of less than about 10 ppm.

The use of the plate construction with its planar parts and the heat transfer tubes, and the monolith gas flow passage components, results in a lightweight, sturdy selective oxidizer assemblage which provides large surface area per unit volume of the selective oxidizer, and very efficient heat transfer. The monolith gas flow components also result in an effectively mixed gas flow through the selective oxidizer assemblage. The weight and size savings achieved by using the construction described above is highly desirable for vehicular applications and also benefits larger higher power output fuel cell power plants, or stand-alone selective oxidizers. Aluminum, stainless steel, aluminum-steel alloy, nickel and ceramic monolith cores of the type described above can be obtained from ERG Energy Research and Generation, Inc. of Oakland, Calif. which are sold under the registered trademark "DUOCEL". The coolant flow conduits can be obtained from a number of sources, including Thermalex, Inc. of Montgomery, A.

Since many changes and variations of the disclosed embodiments of the invention may be made without departing from the inventive concept, it is not intended to limit the invention other than as required by the appended claims.

What is claimed is:

1. A heat exchange assembly comprising a non-catalyzed monolithic open cell foam component containing cells which provide a gas mixing flow pattern for a gas flowing through said foam component, and said foam component including a lattice which provides heat transfer; and at least one heat exchange fluid conduit in contact with said foam component, said heat exchange fluid conduit containing a coolant fluid which absorbs heat from said lattice.

2. The heat exchange assembly of claim 1 wherein said foam component lattice is formed from a brazable material.

3. The heat exchange assembly of claim 2 wherein said heat exchange fluid conduit is sandwiched between two of said foam components, which foam components are brazed to said heat exchange fluid conduit.

4. The heat exchange assembly of claim 3 wherein said foam components are sandwiched between, and brazed to plates which define outer margins of said heat exchange assembly.

5. A hydrocarbon fuel gas selective oxidizer assembly comprising:

a) a fuel gas inlet for directing a mixture of the fuel gas into the assembly;

b) a metered oxygen or air injection line upstream of said fuel gas inlet;

c) a first catalyzed fuel gas and oxygen flow section connected to said fuel gas inlet, said first catalyzed fuel gas and oxygen flow section providing a gas mixing flow pattern for a fuel gas flowing through said first flow section;

d) a coolant inlet for directing a coolant fluid into the assembly so that the coolant is operable to absorb heat in the assembly; and e) a first heat exchange section connected to said coolant inlet, said first heat exchange section being disposed adjacent to said first catalyzed fuel gas and oxygen flow section, said first heat exchange section containing a monolithic open cell heat exchange foam component including a lattice portion which provides heat transfer from a gas flowing through said heat exchange foam component; and at least one coolant fluid conduit in contact with said heat exchange foam component, said coolant fluid conduit being operable to absorb heat from said lattice.

6. The selective oxidizer assembly of claim 5 further comprising a fuel gas flow structure which is operable to direct fuel gas from said fuel gas and oxygen flow section to said first heat exchange section so as to control fuel gas and oxygen mixture temperatures in said assembly.

7. The selective oxidizer assembly of claim 5 wherein the first catalyst bed operates at a temperature in the range of about 220° F. to about 350° F. and wherein the first heat exchanger section operates at a temperature in the range of about 170° F. to about 350° F.

8. The selective oxidizer assembly of claim 5 wherein said coolant fluid conduit extends through said fuel gas and oxygen flow section.

9. The selective oxidizer assembly of claim 5 wherein said fuel gas and oxygen flow section includes a catalyzed monolithic open cell foam component which provides a gas mixing flow pattern for said fuel gas and oxygen flowing through said catalyzed foam component.

10. The selective oxidizer assembly of claim 5 further including a first plate interposed between said first fuel gas and oxygen flow section and said first heat exchange section, and second and third plates on sides of said first fuel gas and oxygen flow section and said first heat exchange section distal of said first plate.

11. The selective oxidizer assembly of claim 10 wherein said coolant fluid conduit passes through said first, second and third plates so as to provide coolant fluid to both said first fuel gas and oxygen flow section and said first heat exchange section.

12. The selective oxidizer assembly of claim 5 wherein said first catalyzed fuel gas and oxygen flow section is formed from said monolithic open cell foam material.

13. The selective oxidizer assembly of claim 12 wherein the lattice of said open cell foam material in said fuel gas and oxygen flow section is provided with a wash coat on which a suitable catalyst is deposited.

14. The selective oxidizer assembly of claim 5 further comprising a second catalyzed fuel gas and oxygen flow section connected to said first heat exchange section and operable to receive the fuel gas and oxygen mixture from said first heat exchange section, said second catalyzed fuel gas and oxygen flow section including a monolithic open cell flow path foam component that comprises a lattice portion which provides a gas mixing flow pattern for the fuel gas and oxygen mixture flowing through said second fuel gas and oxygen flow section; and a second heat exchange section connected to said second catalyzed fuel gas and oxygen flow section; said coolant fluid conduit being in contact with said fuel gas and oxygen flow section, said coolant fluid conduit being operable to absorb fuel gas and oxygen mixture heat from said lattice.

15. The selective oxidizer of claim 14 further comprising a second heat exchange section connected to said second catalyzed fuel gas and oxygen flow section operable to receive the fuel gas and oxygen mixture from said second fuel gas and oxygen flow section, said second heat exchange section containing a monolithic open cell heat exchange foam component including a lattice portion which provides heat transfer from the fuel gas and oxygen mixture flowing through said heat exchange foam component; said coolant fluid conduit being in contact with said heat exchange foam component, said coolant fluid conduit being operable to absorb fuel gas and oxygen mixture heat from said lattice.

16. A hydrocarbon fuel gas selective oxidizer assembly comprising:
   a) a fuel gas inlet for directing the fuel gas into the assembly;
   b) a metered oxygen or air injection line upstream of said inlet for injecting oxygen or air into said fuel gas;
   c) a first catalyzed fuel gas and oxygen flow section connected to said fuel gas inlet, said first catalyzed fuel gas and oxygen flow section containing a monolithic open cell flow path foam component that comprises a lattice portion which provides a gas mixing flow pattern for the fuel gas and oxygen mixture flowing through said first fuel gas and oxygen flow section;
   d) a coolant inlet for directing a coolant fluid into the assembly; and
   e) a first heat exchange section connected to said coolant inlet, said first heat exchange section being connected to said first catalyzed fuel gas and oxygen flow section and operable to receive the fuel gas and oxygen mixture from said first fuel gas and oxygen flow section, said first heat exchange section containing a monolithic open cell heat exchange foam component which includes a lattice portion which provides heat transfer from the fuel gas and oxygen mixture flowing through said heat exchange foam component; and at least one coolant fluid conduit in contact with said heat exchange foam component, said coolant fluid conduit being operable to absorb fuel gas and oxygen mixture heat from said lattice.

17. The selective oxidizer assembly of claim 16 wherein the first catalyst bed operates at a temperature in the range of about 220° F. to about 350° F. and wherein the first heat exchanger section operates at a temperature in the range of about 170° F. to about 350° F.

18. The selective oxidizer assembly of claim 16 further comprising a second catalyzed fuel gas and oxygen flow section connected to said first heat exchange section and operable to receive the fuel gas and oxygen mixture from said first heat exchange section, said second catalyzed fuel gas and oxygen flow section including a monolithic open cell flow path foam component that comprises a lattice portion which provides a gas mixing flow pattern for the fuel gas and oxygen mixture flowing through said second fuel gas and oxygen flow section; said coolant fluid conduit being in contact with said fuel gas and oxygen flow section, said coolant fluid conduit being operable to absorb fuel gas and oxygen mixture heat from said lattice.

19. The selective oxidizer assembly of claim 18 wherein said second catalyst bed operates at a temperature in the range of about 170° F. to about 240° F.

20. The selective oxidizer assembly of claim 18 further comprising a second heat exchanger section connected to said second catalyzed fuel gas and oxygen flow section operable to receive the fuel gas and oxygen mixture from said second fuel gas and oxygen flow section, said second heat exchange section containing a monolithic open cell heat exchange foam component including a lattice portion which provides heat transfer from the fuel gas and oxygen mixture flowing through said heat exchange foam component; said coolant fluid conduit being in contact with said heat exchange foam component, said coolant fluid conduit being operable to absorb fuel gas and oxygen mixture heat from said lattice.

21. The selective oxidizer assembly of claim 20 wherein said second heat exchanger section operates at a temperature in the range of about 170° F. to about 240° F.

22. The selective oxidizer assembly of claim 20 further comprising metal plates separating each of the fuel gas and oxygen flow sections from adjacent heat exchange sections.

23. The selective oxidizer assembly of claim 22 wherein said monolithic foam components in said assembly are brazed to said plates.

24. The selective oxidizer assembly of claim 23 wherein said coolant fluid conduit extends through all of said monolithic open cell foam components and all of said plates.

25. The selective oxidizer assembly of claim 23 wherein said coolant fluid conduit extends through all monolithic open cell foam components and parallel to said plates.

26. The selective oxidizer assembly of claim 23 wherein the fuel gas and oxygen mixture flows through the assembly in directions which are perpendicular to the direction of flow of the coolant fluid.

27. The selective oxidizer assembly of claim 26 wherein the coolant fluid enters the assembly through the second heat exchange section and exits said assembly through said first fuel gas and oxygen mixture flow section.

* * * * *